(12) United States Patent
Nanba (10) Patent No.: US 8,807,524 B2
(45) Date of Patent: Aug. 19, 2014

(54) ELECTROMAGNETIC VALVE

(75) Inventor: Kunio Nanba, Anjo (JP)

(73) Assignee: Denso Corporation, Kariya (JP)

( * ) Notice: Subject to any disclaimer, the term of this patent is extended or adjusted under 35 U.S.C. 154(b) by 222 days.

(21) Appl. No.: 13/242,755

(22) Filed: Sep. 23, 2011

(65) Prior Publication Data

US 2012/0097875 A1  Apr. 26, 2012

(30) Foreign Application Priority Data

Oct. 20, 2010 (JP) ................................. 2010-235282

(51) Int. Cl.
*F16K 31/06* (2006.01)
*F16K 27/00* (2006.01)

(52) U.S. Cl.
USPC ...................................... 251/129.15; 137/343

(58) Field of Classification Search
USPC ....... 137/343; 138/90, 96 R, 172; 251/129.15
See application file for complete search history.

(56) References Cited

U.S. PATENT DOCUMENTS

| | | | | |
|---|---|---|---|---|
| 3,066,836 A | * | 12/1962 | Trumbull | 222/327 |
| 4,579,147 A | * | 4/1986 | Davies et al. | 137/854 |
| 5,358,215 A | * | 10/1994 | Buth et al. | 251/129.21 |
| 5,680,967 A | * | 10/1997 | Dang et al. | 222/327 |
| 5,911,401 A | * | 6/1999 | Hrytzak et al. | 251/129.15 |
| 7,325,563 B2 | * | 2/2008 | Seko | 137/341 |
| 7,513,481 B2 | * | 4/2009 | Su | 251/82 |
| 7,661,654 B2 | * | 2/2010 | Okuda | 251/366 |
| 7,815,165 B2 | * | 10/2010 | Okuda | 251/127 |
| 2006/0243656 A1 | | 11/2006 | Ooiwa | |
| 2006/0243939 A1 | | 11/2006 | Seko | |
| 2007/0164053 A1 | * | 7/2007 | Son | 222/257 |

OTHER PUBLICATIONS

Japanese Office Action dated Aug. 30, 2012, issued in corresponding Japanese Application No. 2010-235282 with English translation.

* cited by examiner

*Primary Examiner* — John K Fristoe, Jr.
*Assistant Examiner* — Seth W Mackay-Smith
(74) *Attorney, Agent, or Firm* — Nixon & Vanderhye, P.C.

(57) ABSTRACT

An electromagnetic valve includes a valve case, a covering member, a valve member, an urging device, and an electromagnetic driving unit. The case includes a side wall; a bottom wall; an opening; a peripheral end face; a valve accommodating part eccentrically relative to a central axis of the opening; and a first port. The covering member includes a top plate part welded on the end face to cover the opening; a second port; a cylindrical part; and a valve seat on an end face of the cylindrical part. The valve member is accommodated in the accommodating part, and engaged with/disengaged from the valve seat to close/open a flow passage of fluid between the first and second ports. The case includes an auxiliary wall symmetrically to the side wall located closer to a valve axis with respect to a shorter symmetry plane. The plate part is welded on an opening-side end face of the auxiliary wall.

7 Claims, 7 Drawing Sheets

ELECTROMAGNETIC VALVE

CROSS REFERENCE TO RELATED APPLICATION

This application is based on and incorporates herein by reference Japanese Patent Application No. 2010-235282 filed on Oct. 20, 2010.

BACKGROUND OF THE INVENTION

1. Field of the Invention

The present invention relates to an electromagnetic valve that opens or closes a flow passage for fluid.

2. Description of Related Art

An electromagnetic valve disposed in a purge passage of an evaporated fuel treating device is conventionally known. For example, an electromagnetic valve described in JP-A-2006-308045 (corresponding to US2006/0243939A1) is formed by welding a covering member formed from resin to a peripheral edge part of an opening of a valve case formed from resin. The valve case is provided with an inlet port for introducing evaporated fuel, and an electromagnetic driving unit that is energized by the outside to reciprocate a valve member is attached to the valve case. The covering member is provided with an outlet port for discharging evaporated fuel, and a valve seat is formed on an end face of a cylindrical part of the covering member communicating with the outlet port. As a result of engagement of the valve member with the valve seat or disengagement of the valve member from the valve seat, the electromagnetic valve closes or opens a flow passage for evaporated fuel from the inlet port to the outlet port.

Generally, for example, poly butylene terephthalate (PBT) or polyamide (PA) 66 having resistance to fuel and flame resistance, is used as a resin material, from which the valve case and the covering member are formed. However, if alcohol fuel is contained in evaporated fuel, PBT or the like, which is easy to hydrolyze, is unsuitable. On the other hand, although not hydrolyzed, PA66 or the like can easily absorb water produced through alcohol dehydration reaction. If the covering member is formed from water-absorbing resin, because the peripheral edge part of the covering member is welded and fixed to the valve case, the covering member is deformed to crawl up outward in the valve axial direction when swollen due to the water absorption.

Particularly, if a chamber is provided inside the valve case on the inlet port-side as in the electromagnetic valve in JP-A-2006-308045, the valve axis is disposed to be eccentric relative to the central axis of the opening of the valve case. Accordingly, when the covering member crawls up to be deformed, deformation of the covering member on a longer-direction side from the valve axis is greater than deformation of the covering member on a shorter-direction side from the valve axis. As a result, the valve seat formed integrally with the covering member is inclined with respect to an end face of the valve member provided for the valve case, and a sealing failure may be caused at the time of engagement of the valve member with the valve seat.

SUMMARY OF THE INVENTION

The present invention addresses at least one of the above disadvantages.

According to the present invention, there is provided an electromagnetic valve including a valve case, a covering member, a valve member, an urging means, and an electromagnetic driving unit. The valve case is formed in a generally cylindrical shape from resin and includes a side wall, a bottom wall, an opening, a peripheral end face, a valve accommodating part, and a first port. The opening is formed at one end of the valve case. The peripheral end face is formed at a peripheral border of the opening. The valve accommodating part is formed eccentrically relative to a central axis of the opening. The first port is formed on an opposite side of the central axis of the opening from the valve accommodating part to communicate with an outside of the side wall or the bottom wall. The covering member is formed from resin and includes a top plate part, a second port, a cylindrical part, and a valve seat. The top plate part is welded or adhesively bonded on the peripheral end face to cover the opening. The second port communicates with an outside of the top plate part. The cylindrical part extends from the top plate part toward the valve accommodating part, and has a fluid passage that communicates with the second port. The valve seat is formed on an end face of the cylindrical part. The valve member is accommodated in the valve accommodating part, and is configured to be engaged with or disengaged from the valve seat so as to close or open a flow passage of fluid between the first port and the second port. The urging means is accommodated in the valve accommodating part for urging the valve member in a direction to close or open the flow passage. The electromagnetic driving unit is accommodated in the valve accommodating part, and is configured to generate electromagnetic attraction so as to drive the valve member in the direction to close or open the flow passage against the urging means. Provided that: an imaginary plane including a valve axis, which is a central axis of the valve accommodating part, and the central axis of the opening is a longitudinal symmetry plane; and an imaginary plane including the valve axis and perpendicular to the longitudinal symmetry plane is a shorter symmetry plane, the valve case further includes an auxiliary wall symmetrically to the side wall, which is located closer to the valve axis, with respect to the shorter symmetry plane. The top plate part of the covering member is welded or adhesively bonded on an opening-side end face of the auxiliary wall.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
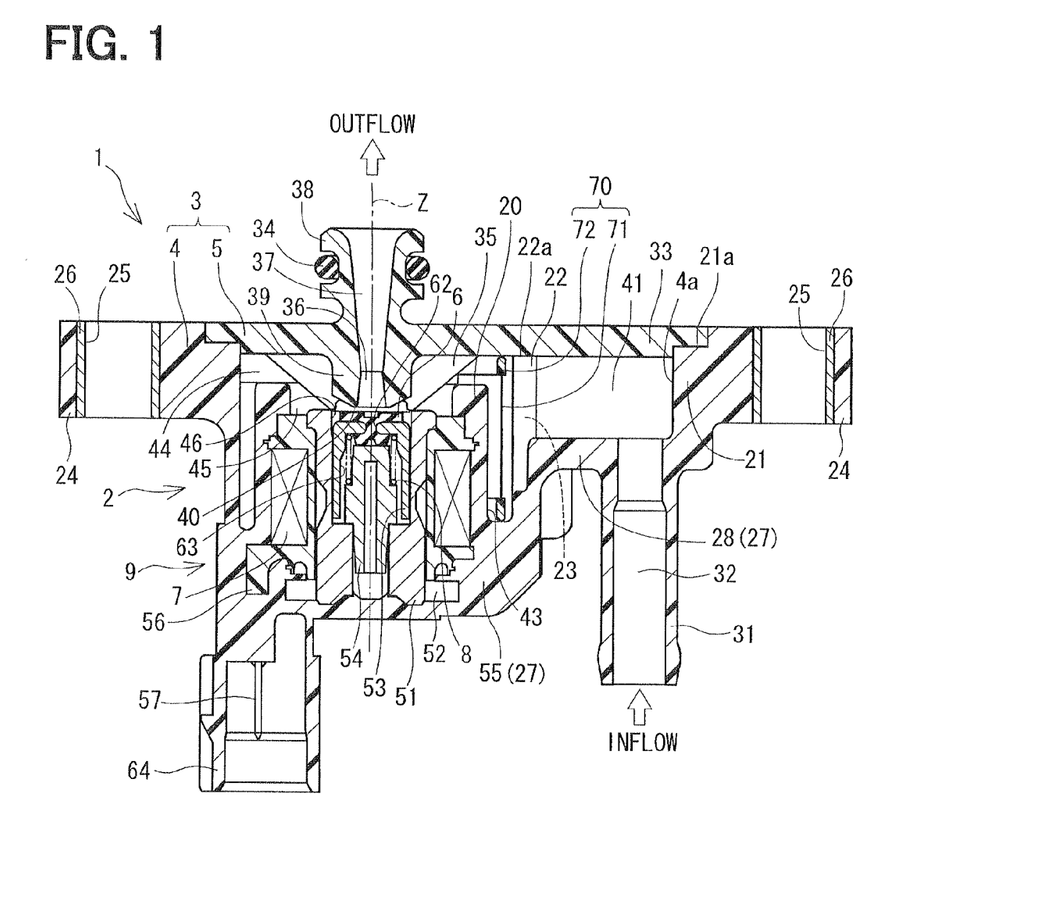
FIG. 1 is a sectional view illustrating an electromagnetic valve in accordance with an embodiment of the invention.
Figure 2:
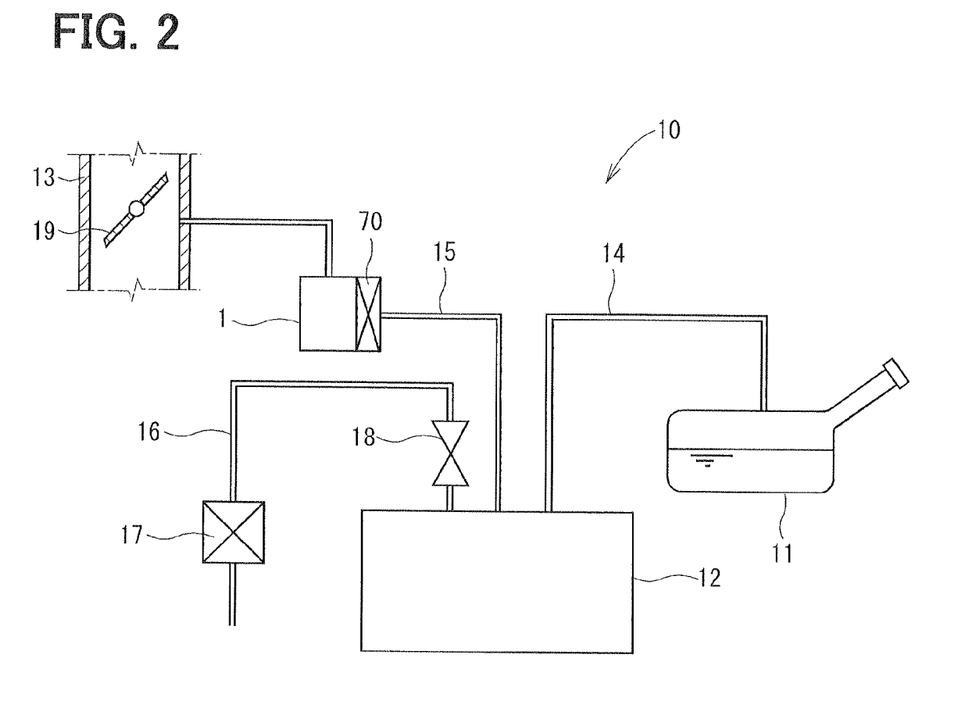
FIG. 2 is a schematic diagram illustrating the entire configuration of an evaporated fuel treating device in which the electromagnetic valve in accordance with the embodiment is disposed.

An embodiment will be described below in reference to the accompanying drawings. In the embodiment, an electromagnetic valve of the invention is applied to an evaporated fuel treating device, which is disposed in a vehicle such as an automobile to introduce evaporated fuel into an engine intake pipe. An evaporated fuel treating device 10 introduces fluid, for example, evaporated fuel, which has been evaporated in a fuel tank 11 in a vehicle such as an automobile, into an engine intake pipe 13 using intake pipe negative pressure, as illustrated in FIG. 2. The fluid such as evaporated fuel is adsorbed through a canister 12 so as not to be discharged into the atmosphere.

The canister 12 communicates with the fuel tank 11 through an evaporated fuel introducing passage 14. Adsorbent, such as activated carbon, is accommodated inside the canister 12 to adsorb the fluid such as evaporated fuel. The canister 12 can also introduce air through an air introducing passage 16. A filter 17 that filters the air flowing into the canister 12 from the outside of the device 10, and a canister control valve 18, which is a normally-closed electromagnetic opening and closing valve, are disposed along the air introducing passage 16.

A throttle valve 19 for adjusting the amount of intake air, which flows through an intake passage communicating with the inside of a fuel chamber of each cylinder of the engine, is disposed in the engine intake pipe 13. The canister 12 communicates with a downstream side of the throttle valve 19, which is a negative pressure generating portion of the engine intake pipe 13, through a purge passage 15. An electromagnetic valve 1 is disposed along the purge passage 15. The electromagnetic valve 1 includes a mesh filter 70 on its canister-side, which is an upstream side in a flow direction of fluid. While the engine is in operation, by opening the canister control valve 18 along the air introducing passage 16, air is introduced from the outside into the canister 12; and by opening the electromagnetic valve 1 along the purge passage 15, the evaporated fuel adsorbed into the canister 12 is guided out into the engine intake pipe 13.

Configuration of the electromagnetic valve 1 of the present embodiment will be described with reference to FIGS. 1, and 3A to 5B. The electromagnetic valve 1 is a duty control valve serving as a normally-closed electromagnetic fluid flow control valve. The electromagnetic valve 1 controls a purge flow rate of fluid introduced from the canister 12 into the engine intake pipe 13 through the control of a duty ratio for a duration of energization of the electromagnetic valve 1 by a signal from an engine control unit (ECU).

The electromagnetic valve 1 is composed of a housing 3, a valve 6, a coil spring 8, an electromagnetic driving unit 9, the mesh filter 70, and so forth. The valve 6 may correspond to a "valve member", and the coil spring 8 may correspond to an "urging means". The housing 3 includes an inlet port 31 and an outlet port 38 as fluid passage pipes connected along the purge passage 15. The valve 6 is accommodated inside the housing 3 so as to open and close a flow passage. The coil spring 8 urges the valve 6 in a direction to press the valve 6 on a seat surface 40. The electromagnetic driving unit 9 is disposed inside the housing 3 integrally with the housing 3 to control the opening and closing of the valve 6. The mesh filter 70 captures foreign substances mixed into fluid flowing into the electromagnetic valve 1 to prevent entering of the foreign substances into the engine intake pipe 13. Configuration of each part of the valve 1 will be described in detail below. In the following description of the electromagnetic valve 1, the valve 1 will be explained with an upper side on a plane of paper in FIG. 1 as "up", and with a lower side on the plane of paper in FIG. 1 as "down". The housing 3 is constituted of a valve case 4 and a seat 5 of a valve.

The valve seat 5 may correspond to a "covering member". The valve case 4 and the seat 5 are formed from a resin material having resistance to fuel and flame resistance, such as PA 66 or resin containing its glass fiber.

The valve case 4 has a generally cylindrical container shape, and a valve accommodating part 20, a side wall 21, an auxiliary wall 22, a bottom wall 27, an attachment stay 24, the inlet port 31, and so forth, are formed integrally with the case 4. The valve accommodating part 20 is formed cylindrically radially inward of the side wall 21, and accommodates the valve 6, a solenoid coil 7, and so forth, coaxially with the accommodating part 20. The central axis of the valve accommodating part 20, the valve 6 and so forth is hereinafter referred to as a valve axis Z.

Figure 4:
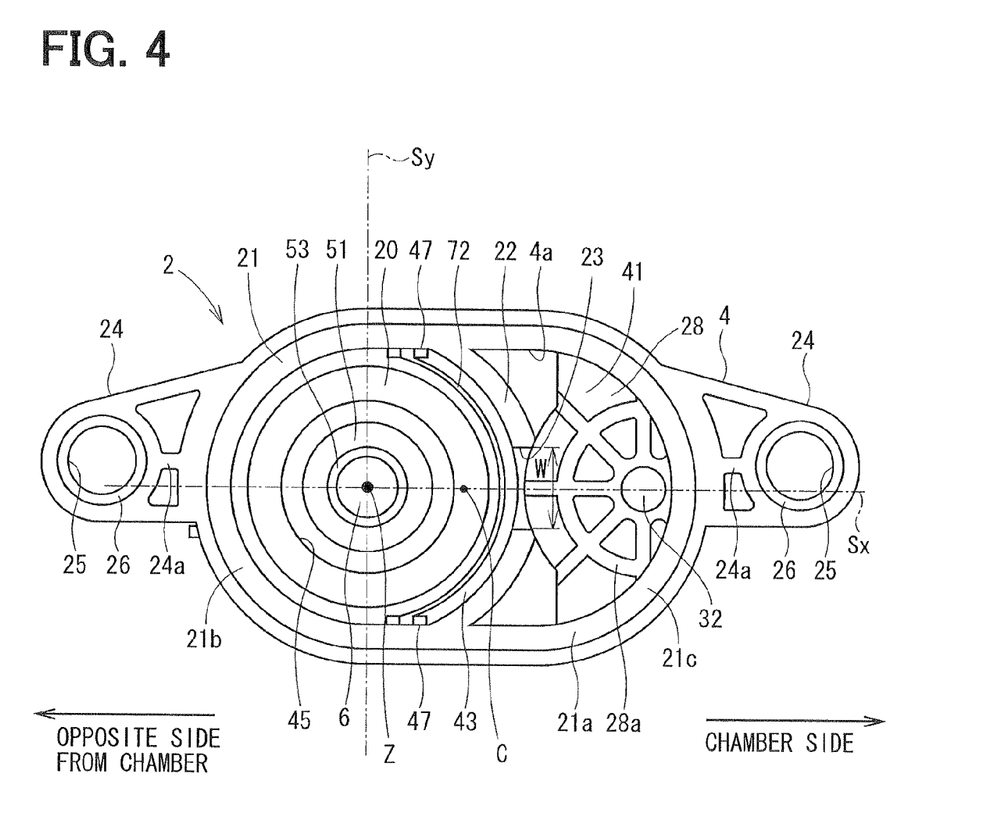
FIG. 4 is a plan view illustrating a coil assembly in accordance with the embodiment.

The valve case 4 has an opening 4a. As illustrated in FIG. 4, in the present embodiment, the opening 4a has a generally elliptical shape. The valve axis Z is eccentric relative to the central axis C of the opening 4a. A virtual plane including the valve axis Z and the central axis C of the opening 4a is hereinafter referred to as a "longitudinal symmetry plane Sx"; and a virtual plane including the valve axis Z and perpendicular to the longitudinal symmetry plane Sx is hereinafter referred to as a "shorter symmetry plane Sy". In addition, an opposite side of the central axis C of the opening 4a from the valve axis Z is hereinafter referred to as a "chamber side"; and the valve axis Z-side of the central axis C of the opening 4a is hereinafter referred to as an "opposite side from the chamber".

The side wall 21 is formed around a peripheral edge of the opening 4a symmetrically with respect to the longitudinal symmetry plane Sx. The side wall 21 includes a linear portion that is parallel to the longitudinal symmetry plane Sx, and circular portions on the chamber side and on the opposite side from the chamber. The auxiliary wall 22 is formed in an arc-like shape that is generally symmetry to a side wall 21b on the opposite side from the chamber with respect to the shorter symmetry plane Sy. "Generally symmetry" means that the wall 22 is not limited only to a strictly symmetrical configuration because of the case where the wall 22 cannot be strictly symmetrically formed to avoid an interference with, for example, a fitting groove 47 that holds the mesh filter 70. The point of the configuration of the present embodiment is that the auxiliary wall 22 is formed at a "nearly symmetrical" position with respect to the entire valve case 4.

The auxiliary wall 22 includes a communicating passage 23 that is notched from its end-face side. The communicating passage 23 communicates between a chamber 41 and a filter accommodating space 43, which are described in greater detail hereinafter. A width W of the communicating passage 23 is set so as to ensure a passage area in accordance with the maximum flow rate of evaporated fuel introduced into the electromagnetic valve 1. A peripheral end face 21a which is an end face of the side wall 21, and an auxiliary end face 22a which is an end face of the auxiliary wall 22, holds a top plate part 33 of the seat 5; and the top plate part 33 is welded and fixed to the end faces 21a, 22a. The auxiliary end face 22a may correspond to an "opening-side end face".

A shelf-like part 28 and a resin molded part 55 are formed integrally with the bottom wall 27 serving as the bottom part of the valve case 4. The shelf-like part 28 connects together a side wall 21c on the chamber side and the valve accommodating part 20. A reinforcing rib 28a is provided for the shelf-like part 28. The electromagnetic driving unit 9 is cover with the resin molded part 55. A cylindrical connector shell 64 that holds a connector terminal 57 for supplying an exciting current to the electromagnetic driving unit 9 is formed integrally with the resin molded part 55.

The attachment stay 24 is formed to extend radially outward of the opening 4a on the chamber side and on the opposite side from the chamber. A collar 26 having an insertion hole 25, into which a locking bolt is inserted, is insert-molded in the attachment stay 24. The attachment stay 24 is fastened and fixed to the engine intake pipe 13, the canister 12, a head cover of the engine, an air cleaner, and so forth. A reinforcing rib 24a is formed on a surface of the attachment stay 24.

The inlet port 31 having a shape of a generally circular pipe is formed to project from the shelf-like part 23 in a direction that is parallel to the valve axis Z. Accordingly, the inlet port 31 is formed on the opposite side of the central axis C of the opening from the valve axis Z, and communicates with the outside of the bottom wall 27. The inlet port 31 is connected to the canister 12 through an upstream side portion of the purge passage 15. An inlet passage 32 is formed inside the inlet port 31. The inlet port 31 may correspond to a "first port".

Figure 5A:
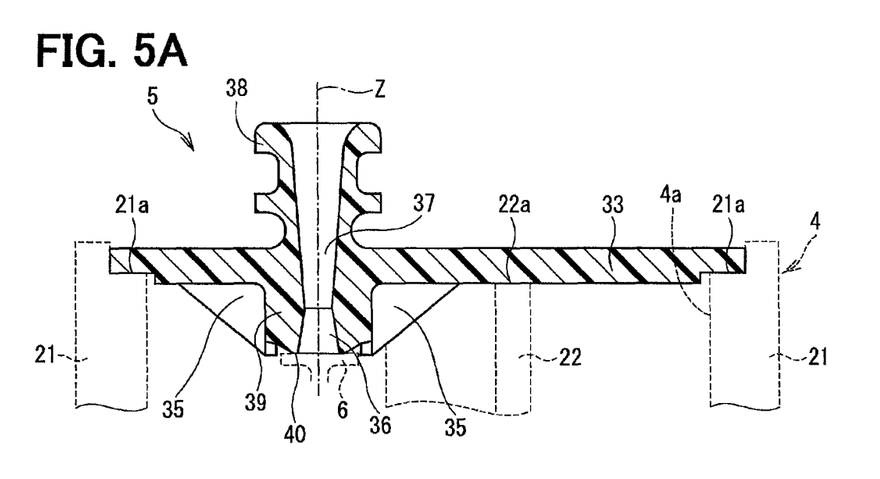
FIG. 5A is a longitudinal sectional view illustrating a valve seat in accordance with the embodiment.

The seat 5 is obtained by integrally forming the top plate part 33, the outlet port 38, and a cylindrical part 39. As illustrated in FIG. 5A, the seat 5 includes the top plate part 33 corresponding to the opening 4a of the valve case 4. The top plate part 33 is welded and fixed to the peripheral end face 21a of the side wall 21 of the valve case 4 and the auxiliary end face 22a of the auxiliary wall 22 to close the opening 4a of the valve case 4.

Figure 5B:
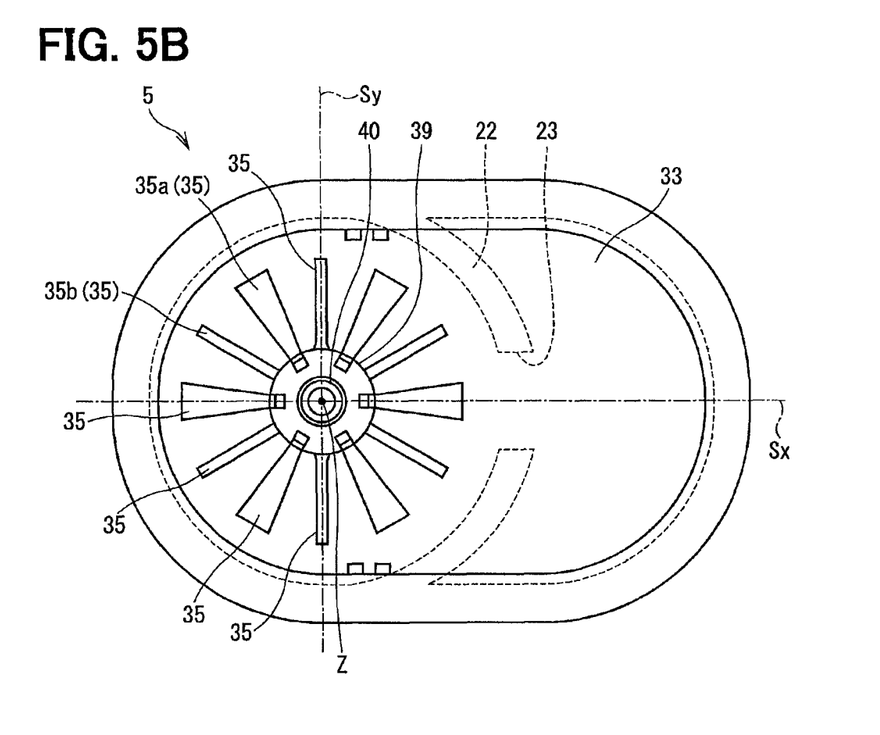
FIG. 5B is a bottom view illustrating the valve seat in accordance with the embodiment.

As illustrated in FIG. 5B, the seat 5 includes ribs 35 connecting an outer peripheral surface of the cylindrical part 39 and the top plate part 33 symmetrically with respect to the valve axis Z. In the present embodiment, the ribs 35 are arranged at twelve positions at regular intervals in the circumferential direction of the cylindrical part 39. Furthermore, the ribs 35 are arranged such that relatively thick ribs 35a and relatively thin ribs 35b are alternately disposed.

The outlet port 38 having a shape of a generally circular pipe extends upward in the valve axis Z perpendicular to the top plate part 33. The outlet port 38 is connected to the engine intake pipe 13 through a downstream side of the purge passage 15. An O ring 34 for maintaining airtightness between the outlet port 38 and a pipe joint (not shown) is attached around the outlet port 38. The outlet port 38 may correspond to a "second port".

The cylindrical part 39 extends on the opposite side of the top plate part 33 from the outlet port 38, i.e., downward in the valve axis Z. The seat surface 40 is formed into an annular shape at a lower end of the cylindrical part 39. The valve 6 can engage with the seat surface 40. The seat surface 40 may correspond to a "valve seat".

A valve hole 36 that is opened or closed by the valve 6, and an outlet passage 37 which is continuous with the valve hole 36 and whose inner diameter is gradually increased, are formed inside the cylindrical part 39 and the outlet port 38. The valve hole 36 and the outlet passage 37 may correspond to a "fluid passage that communicates with the second port".

The chamber 41 having a comparatively large volume is defined in a space surrounded with the side wall 21, the auxiliary wall 22, the shelf-like part 28 of the bottom wall 27, and the top plate part 33 with the seat 5 welded to the valve case 4. The chamber 41 attenuates pressure pulsation of the fluid such as evaporated fuel flowing in through the inlet passage 32.

An annular space 44 is defined radially outward of the cylindrical part 39 between an upper surface of the valve accommodating part 20 and the top plate part 33. An annular space 45 is formed radially inward of the valve accommodating part 20 as well as radially outward of the cylindrical part 39. A valve chamber 46 is defined radially inward of the annular space 45 and between the seat surface 40 and an upper surface of the electromagnetic driving unit 9.

The electromagnetic driving unit 9 is made up of the solenoid coil 7, a stator core 51, a yoke 52, a moving core 53, a piece 54, and so forth. The stator core 51 and the yoke 52 are fixed cores, and the moving core 53 is a movable core. Upon supply of the exciting current to the solenoid coil 7, magnetic attraction force is generated in the fixed cores and the movable core.

The solenoid coil 7 generates magnetomotive force upon energization thereof to magnetize magnetic substances of the moving core 53, the stator core 51, and the yoke 52 made of a magnetic material. The solenoid coil 7 is configured by winding a conductive wire coated with a dielectric film two or more times around a cylindrical coil bobbin 56. The coil bobbin 56 is disposed between the resin molded part 55 and the stator core 51. A radially outward part of the solenoid coil 7 is coated with and protected by the resin molded part 55. A terminal lead wire extended from the solenoid coil 7 is electrically connected to the connector terminal 57.

The stator core 51 is cylindrically formed from a magnetic material, and magnetized upon energization of the solenoid coil 7 so as to become an electromagnet. The stator core 51 includes a large diameter hole 51a on its upper side, and includes a small diameter hole 51b on the lower side of the large diameter hole 51a. A stepped surface 51c between the large diameter hole 51a and the small diameter hole 51b attracts the moving core 53 in a downward direction.

The moving core 53 is formed into a cup shape from a magnetic material, and magnetized upon energization of the solenoid coil 7 to become an electromagnet, so that the moving core 53 is attracted to the stepped surface 51c of the stator core 51. When the solenoid coil 7 is not energized, the moving core 53 applies a load to the valve 6 in a direction to engage the valve 6 with the seat surface 40 by urging force of the coil spring 8.

The moving core 53 has a cup shape such that its upper end side in the direction of the valve axis Z is closed and its lower end side opens. A cup-shaped inner-diameter part of the core 53 is inserted slidably around an outer diameter part of the piece 54, and a cup-shaped outer-diameter part of the core 53 is inserted slidably into the large diameter hole 51a of the stator core 51. A through hole 62 passing through the core 53 in the axial direction is formed in the center of the upper end side of the core 53. The coil spring 8 is accommodated in a spring chamber 63, which is a cylindrical space between the moving core 53 and the piece 54.

Figure 3A:
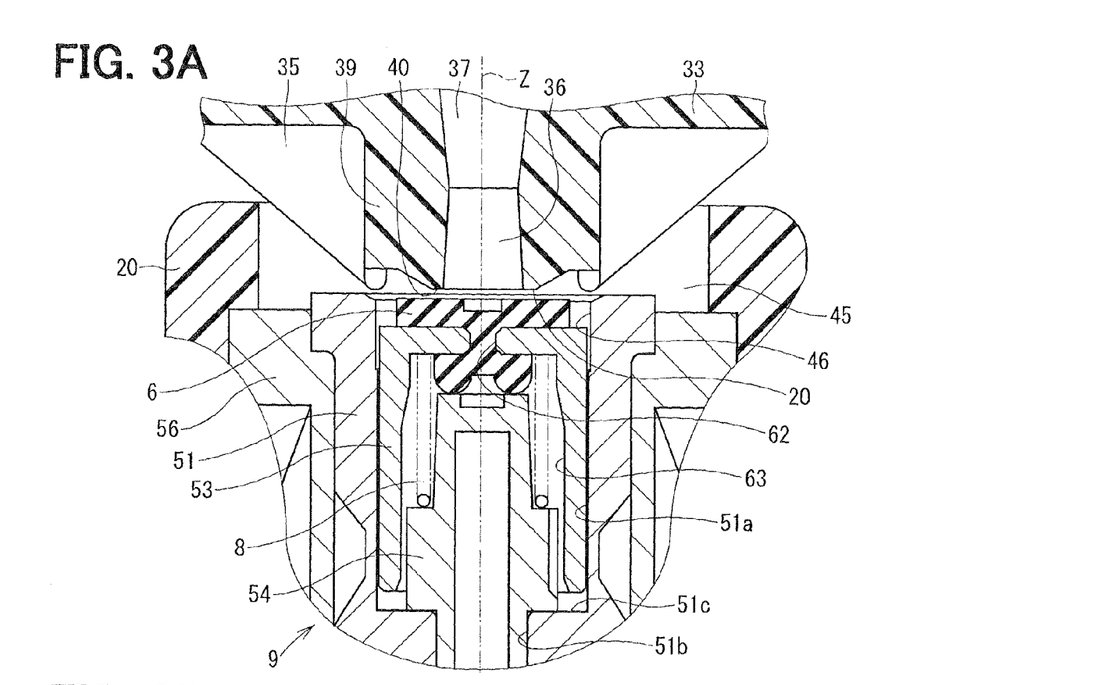
FIG. 3A is an enlarged view illustrating a main feature of the electromagnetic valve in accordance with the embodiment when the valve is open.
Figure 3B:
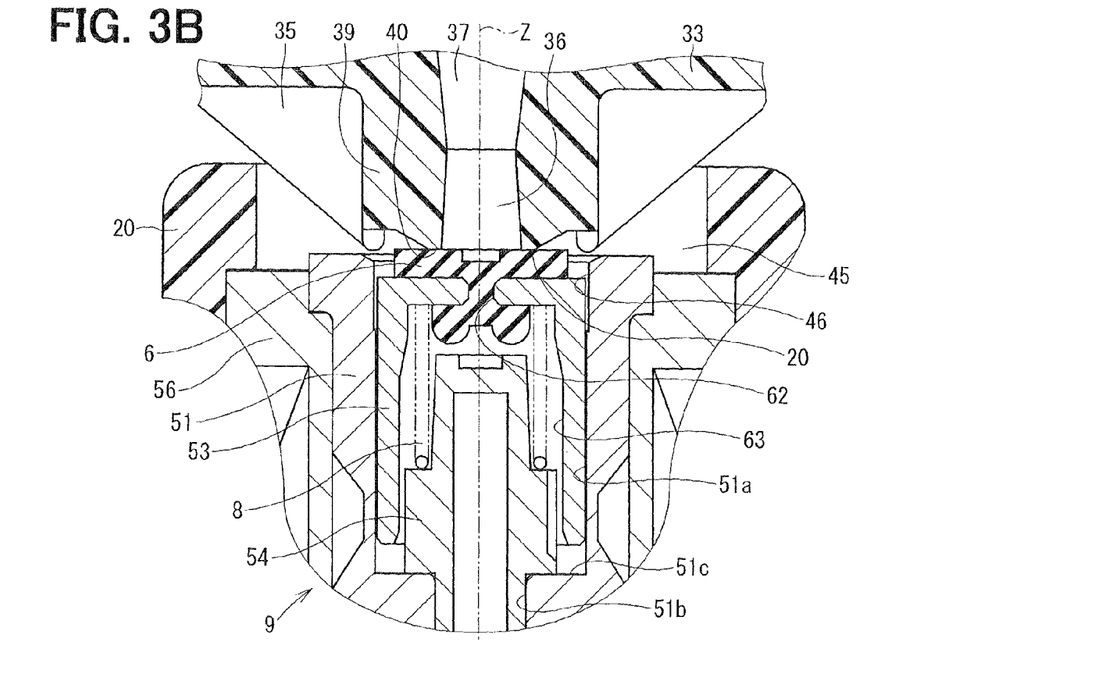
FIG. 3B is an enlarged view illustrating the main feature of the electromagnetic valve in accordance with the embodiment when the valve is closed.

The piece 54 is fitted into the small diameter hole 51b of the stator core 51 to be held by the hole 51b. As illustrated in FIG. 3A, when the moving core 53 is attracted in the downward direction, a lower end portion of the valve 6 that moves integrally with the moving core 53 is brought into contact with an upper end face of the piece 54, so that displacement of the valve 6 in the downward direction, i.e., in a valve opening direction is limited. A moving distance of the moving core 53 and the valve 6 at this time is a full lift amount.

The valve 6 is formed from a rubber elastic body, such as fluorocarbon rubber or silicon rubber. The valve 6 is attached to the through hole 62 of the moving core 53 integrally with the hole 62 to reciprocate in the valve chamber 46 in the axial direction. The upper end portion of the valve 6 is a rubber seal part having an annular shape; and when the solenoid coil 7 is not energized, the upper end portion of the valve 6 is engaged with the seat surface 40 by urging force of the coil spring 8 (see FIG. 3B). The rubber seal part of the valve 6 disengages from the seat surface 40 upon energization of the solenoid coil 7 (see FIG. 3A). Consequently, the valve hole 36 communicates with the valve chamber 46. The lower end portion of the valve 6 is a rubber cushion part having an annular shape, and can be in contact with the upper end face of the piece 54. In addition, the rubber cushion part of the valve 6 absorbs an impact at the time of contact of the valve 6 with the upper end face of the piece 54.

The coil spring 8 is accommodated in the spring chamber 63 formed between the moving core 53 and the piece 54. One end of the coil spring 8 is in contact with the piece 54, and the other end of the coil spring 8 is in contact with the moving core 53 to urge the valve 6 in a valve closing direction. A subassembly, in which the electromagnetic driving unit 9, the valve 6, and the coil spring 8 are attached to the valve case 4, is referred to as a coil assembly 2. The electromagnetic valve 1 is completed by attaching the mesh filter 70 to the coil assembly 2 and by welding the seat 5 thereto.

The mesh filter 70 is accommodated in the filter accommodating space 43 between the valve accommodating part 20 and the shelf-like part 28 of the valve case 4. The mesh filter 70 is formed in a palisade shape that is bent on the upstream side in the flow direction of fluid; and the mesh filter 70 is composed of a mesh part 71 having a generally square shape, through which fluid can pass, and a filter frame 72 holding an outer peripheral edge of the mesh part 71. The filter frame 72 is fitted into the fitting groove 47 of the seat 5 to be held by the groove 47.

The mesh part 71 is formed in a sheet-shaped manner from a resin material such as PA. The mesh part 71 captures a foreign substance mixed in fluid flowing in through the inlet port 31 and having a size that is a mesh opening size or larger. The foreign substance is powder produced as a result of micronization of an adsorbent held in the canister 12 due to, for example, engine vibration, dust in the atmosphere entering into the fuel tank 11 during refueling, dust in the air entering through an atmosphere open hole of the canister 12, or the like.

Operation of the electromagnetic valve 1 in accordance with the embodiment of the invention will be described. Upon supply of the exciting current to the solenoid coil 7 from the ECU, a magnetic flux is generated around the solenoid coil 7, so that the stator core 51, the yoke 52, and the moving core 53 are magnetized. As a result, electromagnetic attraction in a direction to approach the stepped surface 51c of the stator core 51 is applied to the moving core 53.

When the moving core 53 moves in the direction to approach the stepped surface 51c of the stator core 51, the valve 6 is disengaged from the seat surface 40 of the seat 5. Then, since the valve hole 36 is opened, the intake pipe negative pressure of the engine intake pipe 13 is introduced into the canister 12. Accordingly, the evaporated fuel, which has been desorbed from the adsorbent in the canister 12, is introduced into the engine intake pipe 13 through the canister 12, the upstream part of the purge passage 15, the inlet port 31 of the electromagnetic valve 1, the inlet passage 32, the chamber 41, the communicating passage 23, the mesh filter 70, the annular space 44, the annular space 45, the valve chamber 46, the valve hole 36, the outlet passage 37, the outlet port 38 of the electromagnetic valve 1, and the downstream part of the purge passage 15. As a result of the capture of the foreign substance mixed in fluid and having a size that is the mesh opening size or larger, by the mesh part 71, entering of the foreign substance into the engine intake pipe 13 is prevented.

In addition, through the control of the duration of energization of the electromagnetic valve 1 by the ECU, a valve opening degree of the valve hole 36 corresponding to the lift amount of the valve 6 is changed, and a purge flow rate of the fluid introduced into the engine intake pipe 13 from the canister 12 can thereby be controlled. When the energization period of the electromagnetic valve 1 is long, an average current passing through the solenoid coil 7 becomes large. In consequence, the moving core 53 moves in the direction to approach the stepped surface 51c of the stator core 51 against the urging force of the coil spring 8. In synchronization with this movement of the moving core 53, the lift amount of the valve 6 becomes large, so that the valve opening degree becomes large. Therefore, the purge flow rate increases.

When the energization period of the electromagnetic valve 1 is short, the average current passing through the solenoid coil 7 becomes small. Accordingly, the moving core 53 is returned by the urging force of the coil spring 8. In synchronization with this movement of the moving core 53, the lift amount of the valve 6 becomes small, so that the valve opening degree becomes small. Thus, the purge flow rate decreases. When the energization of the electromagnetic valve 1 is stopped, the moving core 53 is returned to its initial position by the urging force of the coil spring 8. In synchronization with this movement of the moving core 53, the valve 6 engages with the seat surface 40. As a consequence, the purge passage 15 is closed.

In order to engage the valve 6 with the seat surface 40 to realize the reliable seal, it is important that accuracy of parallelism between the end face of the valve 6 and the seat surface 40 should be ensured. If alcohol fuel is included in the evaporated fuel introduced into the electromagnetic valve 1, for example, PBT which is easily hydrolyzed, may be unsuitable as a resin material for the valve case and the valve seat. On the other hand, although not hydrolyzed, PA66 or the like can easily absorb water produced through alcohol dehydration reaction. Accordingly, particularly when the top plate part 33 of the valve seat whose wall thickness is relatively thin, absorbs water, it matters whether the seat surface 40 can maintain parallelism to the valve 6.

Figure 7A:
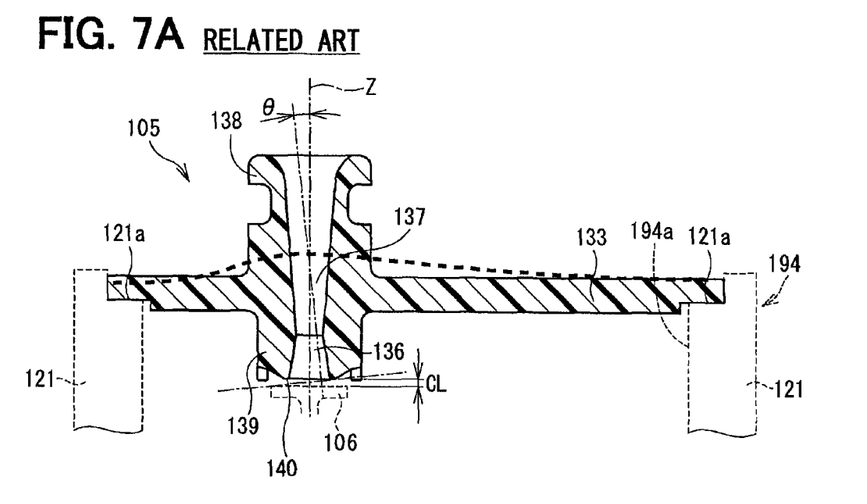
FIG. 7A is a longitudinal sectional view illustrating a valve seat in a comparative example.
Figure 7B:
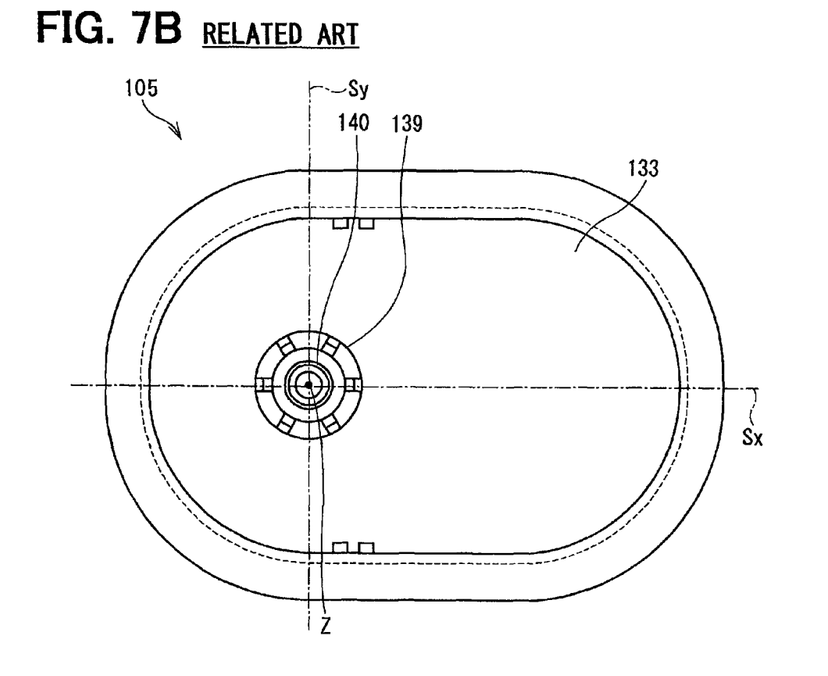
FIG. 7B is a bottom view illustrating the valve seat in the comparative example.

An electromagnetic valve in accordance with a comparative example will be described in reference to FIGS. 7A and 7B. The electromagnetic valve of the comparative example is similar to the embodiment in regard to a shape of an opening 194a of a valve case 194 and a position of a valve axis Z'. However, an auxiliary wall is not provided for the valve case 194, and a rib is not provided for a valve seat 105.

In the comparative example, the valve seat 105 is welded only to a peripheral end face 121a of the valve case 194. Consequently, when the valve seat 105 is swollen due to the water absorption, expansion of the seat 105 on a chamber side, with its distance from the valve axis Z' being long, becomes larger than expansion of the seat 105 on an opposite side from the chamber with its distance from the valve axis Z' being short. Moreover, because there is no rib for prevention of deformation, a top plate part 133 crawls upward and is thereby bent and deformed as indicated in FIG. 7A by a bold short dashes line. As a result, an end of an outlet port 138 is inclined (falls) toward the opposite side from the chamber as indicated by an angle θ, and a seat surface 140 inclines such that its chamber side separates from a valve 106. As a consequence, at the time of closing of the valve 106, a clearance CL is made between an end face of the valve 106 and the seat surface 140, and a sealing failure is generated.

In comparison, in the embodiment, the top plate part 33 of the seat 5 is fixed on the peripheral end face 21*a* of the side wall 21 on the opposite side from the chamber, and is fixed on the auxiliary end face 22*a* of the auxiliary wall 22 on the chamber side. In consequence, distances from the valve axis Z to the fixing positions on the opposite side from the chamber and on the chamber side are made nearly equal. Furthermore, deformation of the top plate part 33 is curbed by the rib 35. Therefore, the seat surface 40 can maintain its parallelism to the valve 6. When the valve 6 engages with the seat surface 40, occurrence of the sealing failure can be prevented.

Effects of the electromagnetic valve 1 in accordance with the embodiment of the invention will be explained. Firstly, the auxiliary wall 22 is provided for the valve case 4 symmetrically to the side wall 21*b* on the opposite side from the chamber with respect to the shorter symmetry plane Sy. The top plate part 33 is welded and fixed on the peripheral end face 21*a* of the side wall 21*b* and the auxiliary end face 22*a* of the auxiliary wall 22. Thus, the distances from the valve axis Z to the fixing positions on the opposite side from the chamber and on the chamber side are made nearly equal. Accordingly, if the seat 5 is formed from water-absorbing resin, the seat 5 is swollen generally evenly with respect to the shorter symmetry plane Sy when the seat 5 absorbs water. Consequently, the inclination of the seat surface 40 can be restrained. As a result, when the valve 6 engages with the seat surface 40, occurrence of the sealing failure can be prevented.

Secondly, the communicating passage 23 having a passage area that is equal to or larger than the passage area of the inlet port 31 is formed in the auxiliary wall 22. As a consequence, the maximum flow rate of evaporated fuel can be ensured. Thirdly, the inlet port 31 and the communicating passage 23 are formed symmetrically with respect to the longitudinal symmetry plane Sx. In consequence, the inlet port 31, the communicating passage 23, and the valve axis Z are arranged in a straight line. Therefore, a flow of evaporated fuel is made satisfactory.

Fourthly, since the ribs 35 are provided for the seat 5, deformation of the top plate part 33 is restrained, and the inclination of the seat surface can be further limited. Fifthly, the opening 4*a* of the valve case 4 is formed in a generally elliptical shape; and sectional shapes of the side wall 21*b* on the opposite side from the chamber and the auxiliary wall 22 in a direction perpendicular to the valve axis Z are circular arcs. Thus, the distances from the valve axis Z to the fixing positions are made equal over a wide range in the circumferential direction, which is advantageous in the water absorption by the seat 5. Moreover, because a sectional shape of the side wall 21 of the valve case 4 is a circular arc, transmission of an operating noise of the electromagnetic valve 1 to the outside of the valve 1 can be restricted.

Lastly, the inlet port 31 is provided for the valve case 4, and the outlet port 38 is provided for the seat 5. Accordingly, the mesh filter 70 can be disposed in the filter accommodating space 43 located on the upstream side of the valve 6 inside the electromagnetic valve 1. Furthermore, since the pressure of evaporated fuel is applied in the valve closing direction, the load of the coil spring 8 can be made relatively small, and electromagnetic driving force can accordingly be reduced. As a result, a size of the electromagnetic valve 1 can be made small.

Modifications of the above-described embodiment will be described below. In the above embodiment, the opening 4*a* of the valve case 4 has a generally elliptical shape, and the auxiliary wall 22 has a generally circular arc shape. However, a mode of the electromagnetic valve of the invention is not limited to this. Examples of a shape of an opening of a valve case and a shape of an auxiliary wall in accordance with a modification will be illustrated in FIGS. 6A to 6C. In the modification illustrated in FIG. 6A, an opening 91*a* of a valve case 91 has a generally rectangle shape which is chamfered, and a valve axis Z is eccentric relative to a central axis C of the opening. An auxiliary wall 82 is formed in a generally linear shape symmetrically shape symmetrically to a side wall 81 of the valve case 91 on the opposite side from the chamber with respect to the shorter symmetry plane Sy. In the auxiliary wall 82, a communicating passage 23 is formed symmetrically with respect to a longitudinal symmetry plane Sx.

Figure 6A:
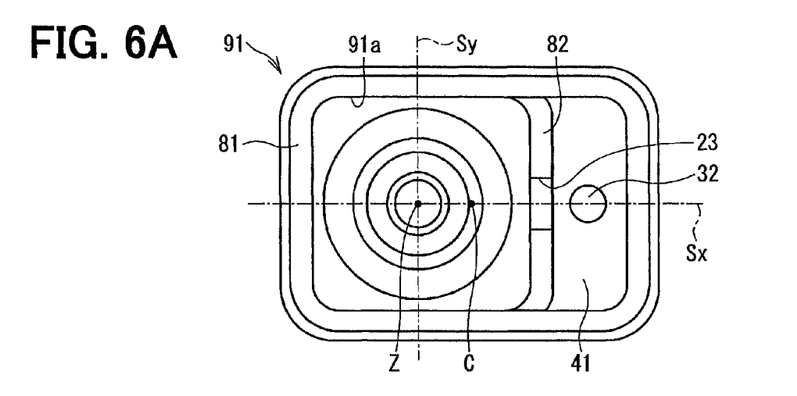
FIG. 6A is a schematic view illustrating a valve case in accordance with a modification to the invention.
Figure 6B:
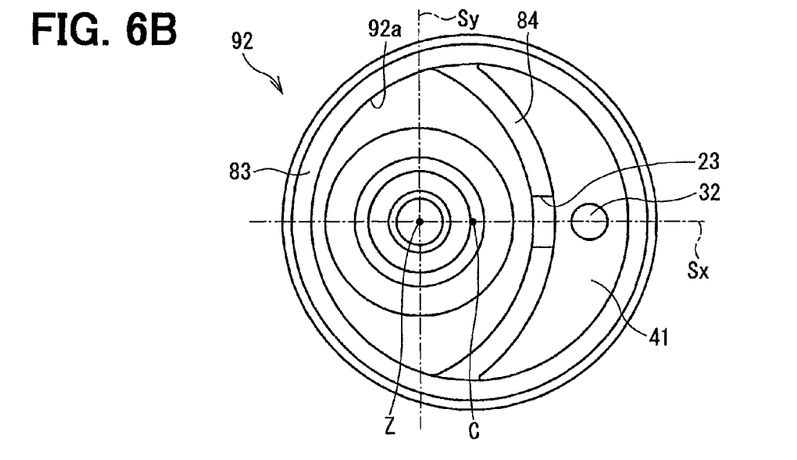
FIG. 6B is a schematic view illustrating a valve case in accordance with a modification to the invention.

In a modification illustrated in FIG. 6B, an opening 92*a* of a valve case 92 has a generally round shape, and a valve axis Z is eccentric relative to a central axis C of the opening. An auxiliary wall 84 is formed into a generally circular arc shape symmetrically to a side wall 83 of the valve case 92 on the opposite side from the chamber with respect to a shorter symmetry plane Sy. A communicating passage 23 is formed in the auxiliary wall 84 symmetrically with respect to a longitudinal symmetry plane Sx.

Figure 6C:
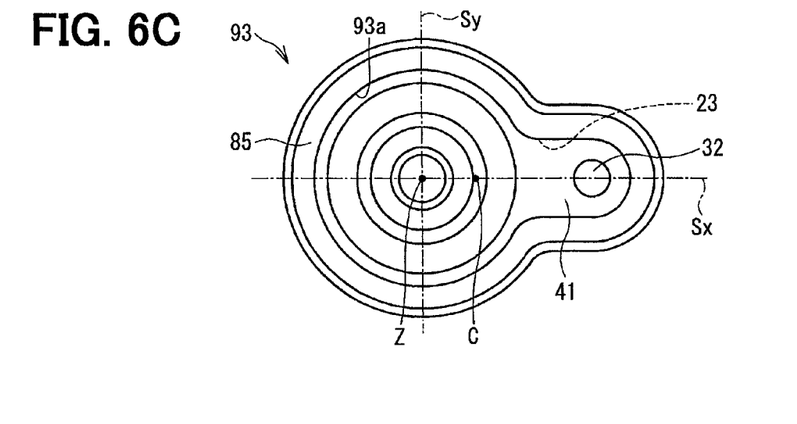
FIG. 6C is a schematic view illustrating a valve case in accordance with a modification to the invention.

In a modification illustrated in FIG. 6C, an opening 93*a* of a valve case 93 has a paddle shape, and a valve axis Z is eccentric relative to a central axis C of the opening. In this case, as a result of the reduction of width of a chamber portion 41 corresponding to a handle of the paddle shape in its shorter direction, a sectional shape of a side wall 85 of the valve case 93 except its portion extending toward a chamber 41, is formed in a C-shaped manner. Consequently, the side wall 85 itself doubles as the portion corresponding to the auxiliary wall, and a part of the opening 93*a* doubles as a communicating passage 23.

In these modifications as well, when the valve seat is swelled due to its water absorption, distances from the shorter symmetry plane Sy to fixing positions are made equal. As a consequence, the inclination of the seat surface 40 is restrained. Therefore, when the valve 6 engages with the seat surface 40, occurrence of the sealing failure can be prevented.

In the above embodiment, the top plate part 33 of the seat 5 is welded to the valve case 4. In this case, any welding method, such as laser welding, heat welding, vibration welding, or ultrasonic welding, may be employed for the welding method. Also, they may be joined together through adhesive bonding instead of welding. In the above embodiment, the ribs 35 connecting an outer peripheral surface of the cylindrical part 39 and the top plate part 33 are provided at twelve places in the circumferential direction symmetrically with respect to the valve axis Z. The number of ribs and their shapes are not limited to this. Moreover, without forming the ribs, deformation of the top plate part may also be limited by increasing a corner R between the cylindrical part and the top plate part, or by making large a wall thickness of the top plate part.

In the above embodiment, the inlet port 31 is provided for the valve case 4, and the outlet port 38 is provided for the seat 5. Conversely, the outlet port may be provided for the valve case, and the inlet port may be provided for the valve seat. Thus, the "first port" may be the outlet port, and the "second port" may be the inlet port. In the above embodiment, the palisaded mesh filter 70 is employed. Alternatively, as the filter, a filter having a generally cylindrical shape may be disposed to surround the cylindrical part. In addition, a wire net, a nonwoven fabric or the like may be used instead of the resin sheet having a meshed shape.

In the above embodiment, the coil spring 8 as the urging means urges the valve 6 in the valve closing direction, and the electromagnetic driving unit 9 drives the valve 6 in the valve opening direction. Conversely, the urging means may urge the valve in the valve opening direction, and the electromagnetic driving unit may urge the valve in the valve opening direction. In the above embodiment, the electromagnetic flow control valve is employed for an electromagnetic valve. Alternatively, an electromagnetic opening and closing valve may be used as an electromagnetic valve. Moreover, the invention may be applied not only to the electromagnetic valve of a normally-closed type, but also to an electromagnetic valve of a normally-open type.

The fluid introduced into the electromagnetic valve is not limited to evaporated fuel. The effects of the invention are produced when the valve seat is formed from water-absorbing resin and there is a possibility that the valve seat is deformed by fluid containing water. The invention is not by any means limited to such an embodiment, and may be embodied in various modes without departing from the scope of the invention.

To sum up, the electromagnetic valve 1 in accordance with the above embodiment can be described as follows.

The electromagnetic valve 1 includes a valve case 4, 91, 92, or 93, a covering member 5, a valve member 6, an urging means 8, and an electromagnetic driving unit 9. The valve case 4, 91, 92, or 93 is formed in a generally cylindrical shape from resin and includes a side wall 21, 21b, 21c, 81, 83, or 85, a bottom wall 27, an opening 4a, 91a, 92a, or 93a, a peripheral end face 21a, a valve accommodating part 20, and a first port 31. The opening 4a, 91a, 92a, or 93a is formed at one end of the valve case 4, 91, 92, or 93. The peripheral end face 21a is formed at a peripheral border of the opening 4a, 91a, 92a, or 93a. The valve accommodating part 20 is formed eccentrically relative to a central axis C of the opening 4a, 91a, 92a, or 93a. The first port 31 is formed on an opposite side of the central axis C of the opening 4a, 91a, 92a, or 93a from the valve accommodating part 20 to communicate with an outside of the side wall 21, 21b, 21c, 81, 83, or 85 or the bottom wall 27. The covering member 5 is formed from resin and includes a top plate part 33, a second port 38, a cylindrical part 39, and a valve seat 40. The top plate part 33 is welded or adhesively bonded on the peripheral end face 21a to cover the opening 4a, 91a, 92a, or 93a. The second port 38 communicates with an outside of the top plate part 33. The cylindrical part 39 extends from the top plate part 33 toward the valve accommodating part 20, and has a fluid passage 36 or 37 that communicates with the second port 38. The valve seat 40 is formed on an end face of the cylindrical part 39. The valve member 6 is accommodated in the valve accommodating part 20, and is configured to be engaged with or disengaged from the valve seat 40 so as to close or open a flow passage 32, 41, 23, 70, 44, 45, 46, 36, or 37 of fluid between the first port 31 and the second port 38. The urging means 8 is accommodated in the valve accommodating part 20 for urging the valve member 6 in a direction to close or open the flow passage 32, 41, 23, 70, 44, 45, 46, 36, or 37. The electromagnetic driving unit 9 is accommodated in the valve accommodating part 20, and is configured to generate electromagnetic attraction so as to drive the valve member 6 in the direction to close or open the flow passage 32, 41, 23, 70, 44, 45, 46, 36, or 37 against the urging means 8. Provided that: an imaginary plane including a valve axis Z, which is a central axis of the valve accommodating part 20, and the central axis C of the opening 4a, 91a, 92a, or 93a is a longitudinal symmetry plane Sx; and an imaginary plane including the valve axis Z and perpendicular to the longitudinal symmetry plane Sx is a shorter symmetry plane Sy, the valve case 4, 91, or 92 further includes an auxiliary wall 22, 82, or 84 symmetrically to the side wall 21b, 81, or 83, which is located closer to the valve axis Z, with respect to the shorter symmetry plane Sy. The top plate part 33 of the covering member 5 is welded or adhesively bonded on an opening 4a, 91a, or 92a-side end face 22a of the auxiliary wall 22, 82, or 84.

The auxiliary wall 22, 82, or 84 being formed "symmetrically" to the side wall 21b, 81, or 83 of the valve case 4, 91, or 92 with respect to the shorter symmetry plane Sy means, not only that the arrangement is strictly symmetrical, but also that a position of the valve case 4, 91, or 92 with respect to the entire electromagnetic valve 1 is generally symmetrical. Accordingly, when the covering member 5 is swelled due to its water absorption, the distances from the shorter symmetry plane Sy to the positions of fixation by welding or adhesive bonding become equal. Consequently, inclination of the valve seat 40 is restrained. As a result, when the valve member 6 engages with the valve seat 40, occurrence of the sealing failure can be prevented.

The auxiliary wall 22, 82, or 84 may include a communicating passage 23 that communicates between the valve accommodating part 20 and the first port 31. The communicating passage 23 may have a flow passage area that is equal to or larger than a flow passage area of the first port 31. Thus, the maximum flow rate of fluid can be secured. The first port 31 and the communicating passage 23 may be formed symmetrically with respect to the longitudinal symmetry plane Sx. As a consequence, the first port 31, the communicating passage 23, and the valve axis Z are arranged in a straight line. Therefore, a flow of fluid is made favorable.

The covering member 5 may further include a plurality of ribs 35, 35a, 35b connecting an outer peripheral part of the cylindrical part 39 and the top plate part 33 symmetrically about the valve axis Z. In consequence, deformation of the covering member 5 due to its water absorption can be limited, and the inclination of the seat surface 40 can be further prevented.

The side wall 21b or 83 of the valve case 4 or 92 located closer to the valve axis Z, and the auxiliary wall 22 or 84 may be circular arcs in cross-section perpendicular to the valve axis Z. Accordingly, the distances from the valve axis Z to the welding portion or bonded part of the covering member 5 are made equal over a wide range in the circumferential direction. As a result, this is advantaged in deformation of the covering member 5 due to its water absorption. Moreover, because the sectional shape of the side wall 21b or 83 of the valve case 4 or 92 is circular arc, transmission of an operating noise of the electromagnetic valve 1 to the outside of the valve 1 can be limited.

The first port 31 may be an inlet port 31, through which fluid is introduced from an outside of the valve case 4, 91, 92, or 93. The second port 38 may be an outlet port 38, through which fluid is discharged into an outside of the covering member 5. Accordingly, the fluid is introduced into the electromagnetic valve 1 through the inlet port 31 on the valve case 4, 91, 92, or 93-side, and is discharged from the outlet port 38 on the covering member 5-side.

Conversely, if the second port on the covering member 5-side is used as the inlet port, the filter for filtering foreign substances in the fluid needs to be provided separately on the upstream side of the electromagnetic valve 1. Furthermore, at the time of the closing of the valve member 6 in the electromagnetic valve 1, in which the urging means 8 urges the valve member 6 in the valve closing direction and the electromagnetic driving unit 9 drives the valve member 6 in the valve opening direction, the load by the urging means 8 needs to be increased to urge the valve member 6 in the valve closing direction against application of the pressure of fluid in the valve opening direction. The electromagnetic driving force for the opening of the valve member 6 needs to be accordingly increased, and the size of the electromagnetic valve 1 is thereby made large.

On the other hand, the first port on the valve case 4, 91, 92, or 93-side serves as the inlet port 31, so that the filter 70 can be disposed in a space between the inlet port 31 and the valve accommodating part 20. In addition, the load by the urging means 8 can be reduced because the pressure of fluid is applied in the valve closing direction. Since the electromagnetic driving force for the opening of the valve member 6 can be made accordingly small, the size of the electromagnetic valve 1 can be reduced.

Additional advantages and modifications will readily occur to those skilled in the art. The invention in its broader terms is therefore not limited to the specific details, representative apparatus, and illustrative examples shown and described.

What is claimed is:

1. An electromagnetic valve comprising:
   a valve case that is formed in a generally cylindrical shape from resin and includes:
      a side wall;
      a bottom wall;
      an auxiliary wall;
      a fitting groove;
      an opening formed at one end of the valve case;
      a peripheral end face formed at a peripheral border of the opening;
      a valve accommodating part formed eccentrically relative to a central axis of the opening; and
      a first port formed on an opposite side of the central axis of the opening from the valve accommodating part to communicate with an outside of the side wall or the bottom wall;
   a filter held by the fitting groove;
   a covering member that is formed from resin and includes:
      a top plate part welded or adhesively bonded on the peripheral end face to cover the opening;
      a second port communicating with an outside of the top plate part;
      a cylindrical part extending from the top plate part toward the valve accommodating part and having a fluid passage that communicates with the second port; and
      a valve seat formed on an end face of the cylindrical part;
   a valve member that is accommodated in the valve accommodating part and is configured to be engaged with or disengaged from the valve seat so as to close or open a flow passage of fluid between the first port and the second port;
   an urging means accommodated in the valve accommodating part for urging the valve member in a direction to close or open the flow passage; and
   an electromagnetic driving unit accommodated in the valve accommodating part and configured to generate electromagnetic attraction so as to drive the valve member in the direction to close or open the flow passage against the urging means, wherein:
   an imaginary plane is provided to include a valve axis, which is a central axis of the valve accommodating part, and the central axis of the opening is a longitudinal symmetry plane; and
   an imaginary plane is provided to include the valve axis and perpendicular to the longitudinal symmetry plane is a shorter symmetry plane,
   the auxiliary wall is positioned symmetrically to the side wall, which is located closer to the valve axis, with respect to the shorter symmetry plane, the auxiliary wall being integrally formed with the valve case, and the auxiliary wall being separate from the filter and the fitting groove;
   the top plate part of the covering member is welded or adhesively bonded on an opening-side end face of the auxiliary wall; and
   the side wall and the auxiliary wall are welded and fixed to the covering member.

2. The electromagnetic valve according to claim 1, wherein:
   the auxiliary wall includes a communicating passage that communicates between the valve accommodating part and the first port; and
   the communicating passage has a flow passage area that is equal to or larger than a flow passage area of the first port.

3. The electromagnetic valve according to claim 2, wherein the first port and the communicating passage are formed symmetrically with respect to the longitudinal symmetry plane.

4. The electromagnetic valve according to claim 1, wherein the covering member further includes a plurality of ribs connecting an outer peripheral part of the cylindrical part and the top plate part symmetrically about the valve axis.

5. The electromagnetic valve according to claim 1, wherein the side wall of the valve case located closer to the valve axis, and the auxiliary wall are circular arcs in cross-section perpendicular to the valve axis.

6. The electromagnetic valve according to claim 1, wherein:
   the first port is an inlet port, through which fluid is introduced from an outside of the valve case; and
   the second port is an outlet port, through which fluid is discharged into an outside of the covering member.

7. An electromagnetic valve comprising:
   a valve case that is formed in a generally cylindrical shape from resin and includes:
      a side wall;
      a bottom wall;
      an auxiliary wall;
      a fitting groove;
      an opening formed at one end of the valve case;
      a peripheral end face formed at a peripheral border of the opening;
      a valve accommodating part formed eccentrically relative to a central axis of the opening; and
      a first port formed on an opposite side of the central axis of the opening from the valve accommodating part to communicate with an outside of the side wall or the bottom wall;
   a filter held by the fitting groove;
   a covering member that is formed from resin and includes:
      a top plate part welded or adhesively bonded on the peripheral end face to cover the opening;
      a second port communicating with an outside of the top plate part;
      a cylindrical part extending from the top plate part toward the valve accommodating part and having a fluid passage that communicates with the second port; and
      a valve seat formed on an end face of the cylindrical part;

a valve member that is accommodated in the valve accommodating part and is configured to be engaged with or disengaged from the valve seat so as to close or open a flow passage of fluid between the first port and the second port;

an urging member accommodated in the valve accommodating part for urging the valve member in a direction to close or open the flow passage; and an electromagnetic driving unit accommodated in the valve accommodating part and configured to generate electromagnetic attraction so as to drive the valve member in the direction to close or open the flow passage against the urging member, wherein:

an imaginary plane is provided to include a valve axis, which is a central axis of the valve accommodating part, and the central axis of the opening is a longitudinal symmetry plane; and an imaginary plane is provided to include the valve axis and perpendicular to the longitudinal symmetry plane is a shorter symmetry plane, the auxiliary wall is positioned symmetrically to the side wall, which is located closer to the valve axis, with respect to the shorter symmetry plane, the auxiliary wall being separate from the filter and the fitting groove;

the top plate part of the covering member is welded or adhesively bonded to an opening-side end face of the auxiliary wall; and the side wall and the auxiliary wall are welded and fixed to the covering member.

* * * * *